United States Patent [19]
Granger et al.

[11] Patent Number: 5,010,548
[45] Date of Patent: Apr. 23, 1991

[54] SCANNER INTERFACE FOR THE LINE ADAPTERS OF A COMMUNICATION CONTROLLER

[75] Inventors: Yves Granger, Antibes; Daniel Wind, La Trinite, both of France

[73] Assignee: IBM Corporation, Armonk, N.Y.

[21] Appl. No.: 297,730

[22] Filed: Jan. 17, 1989

[51] Int. Cl.$^5$ .......................................... G06F 13/38
[52] U.S. Cl. .................................. 370/95.1; 340/825.1
[58] Field of Search .......... 370/96; 340/825.1, 825.11, 340/825.12, 825.13, 825.15

[56] References Cited

U.S. PATENT DOCUMENTS

| | | | |
|---|---|---|---|
| 3,618,037 | 11/1971 | Wollum et al. | 340/172.5 |
| 4,296,464 | 10/1981 | Woods et al. | 364/200 |
| 4,547,880 | 10/1985 | De Vita et al. | 370/96 |
| 4,747,060 | 5/1988 | Sears, III et al. | 340/825.15 |
| 4,816,823 | 3/1989 | Polkinghorne et al. | 340/825.15 |

FOREIGN PATENT DOCUMENTS

| | | |
|---|---|---|
| 0185260 | 6/1986 | European Pat. Off. |
| 8202965 | 9/1982 | World Int. Prop. O. |

*Primary Examiner*—Douglas W. Olms
*Assistant Examiner*—Christopher O. Edwards
*Attorney, Agent, or Firm*—Edward H. Duffield

[57] ABSTRACT

A line-adapter of a communications controller includes, for scanning the teleprocessing lines connected to it, cyclic scanning means FES exchanging information with the lines through a serial bidirectional link on which data and control informations are partitioned into frames and slots. Since both the FES and the serial link work with their own timings, an interface FESA is provided to adapt the FES scanning to the serial link structure. This FESA includes temporary storage means for storing on the one hand, data and control information transmitted from the LICs to the FES (10) through the inbound serial link, and on the other hand, data and control information transmitted from the FES to the LICs through the outbound serial link. The access of the FES, the outbound and inbound serial link to the storage means is time-shared and granted by an arbitration logic, according to the relative priorities of operation of said elements within the line-adapter of the communications controller.

8 Claims, 13 Drawing Sheets

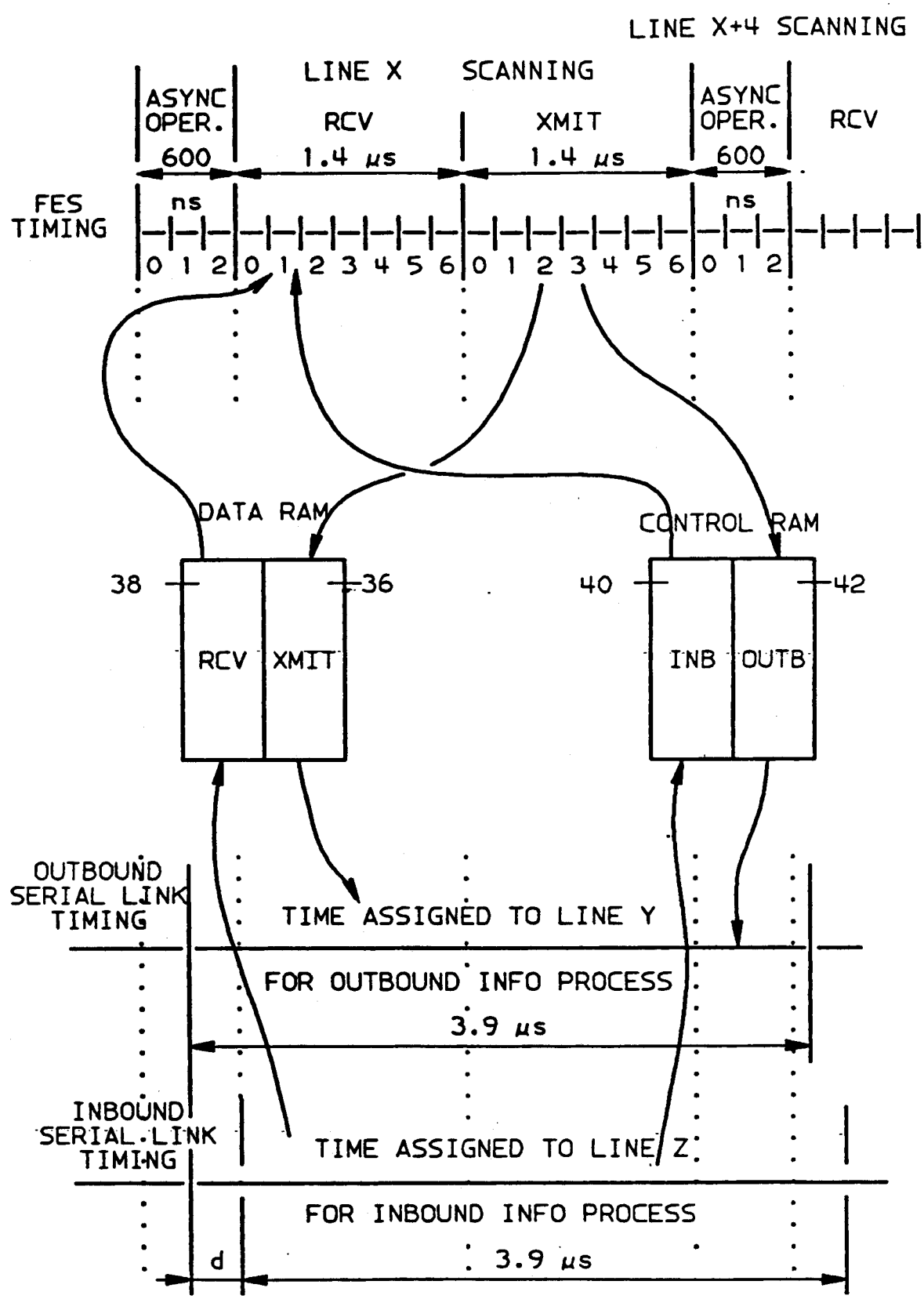
- FIGURE 3 -

— FIGURE 4 —

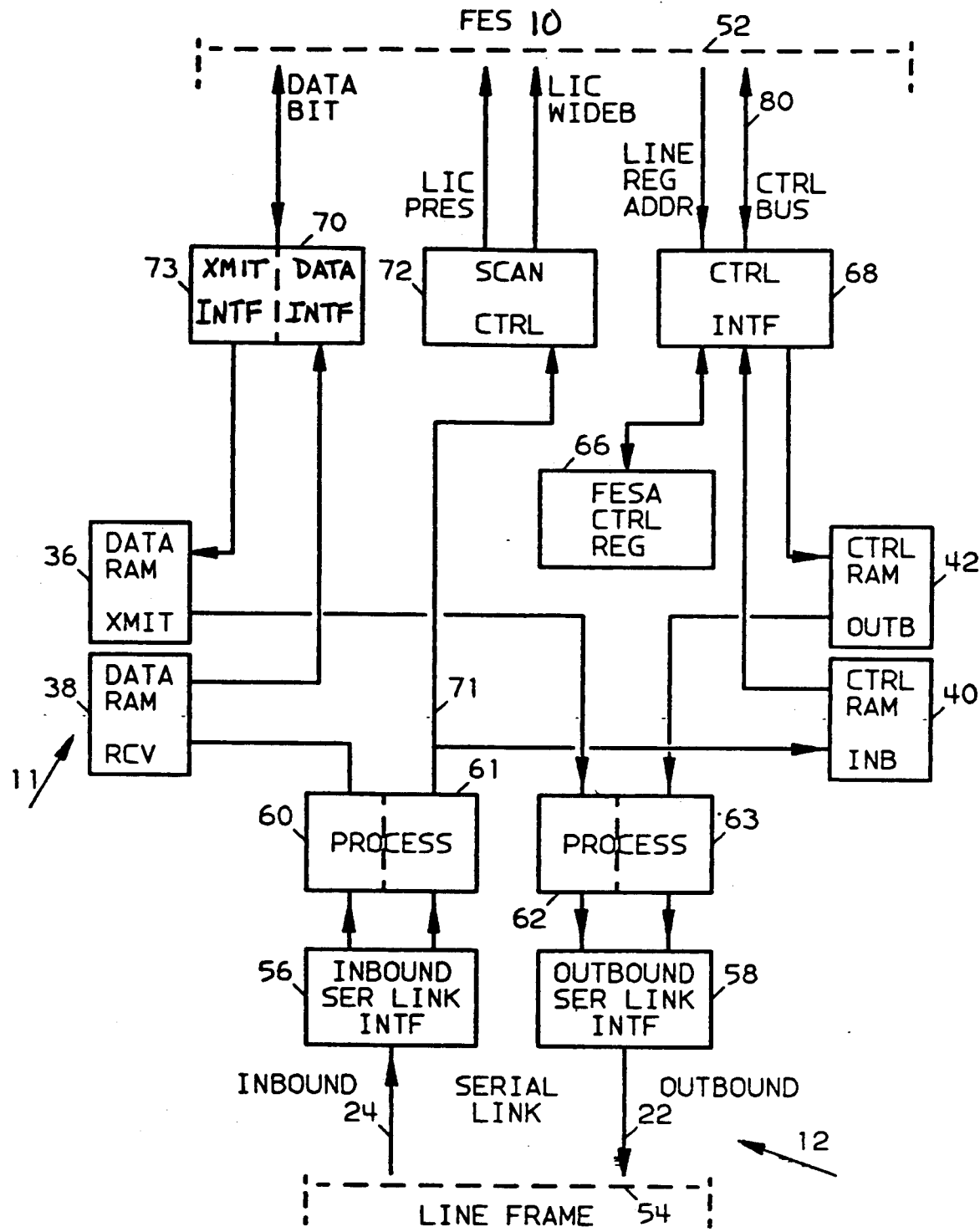
- FIGURE 5 -

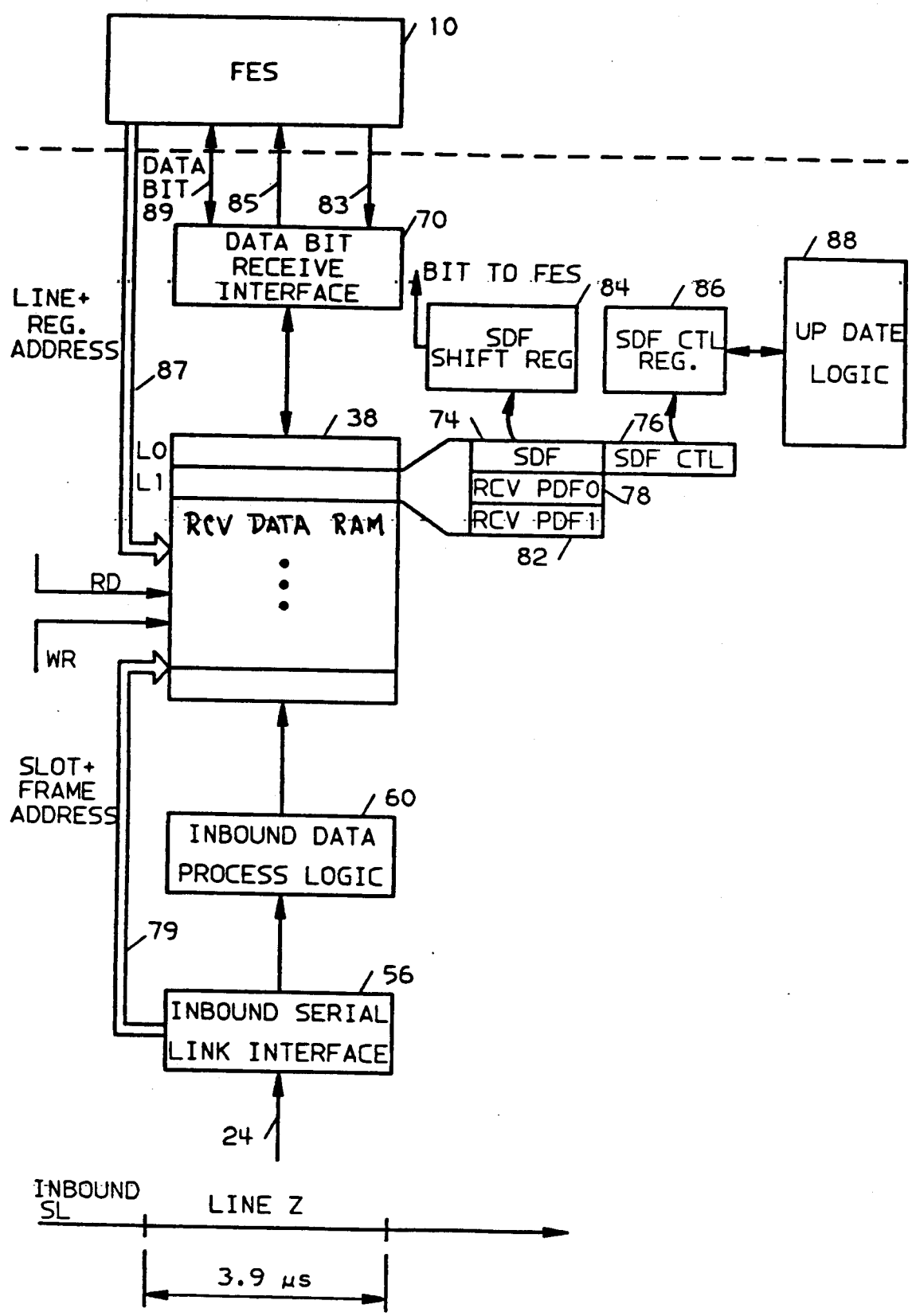
- FIGURE 6 -

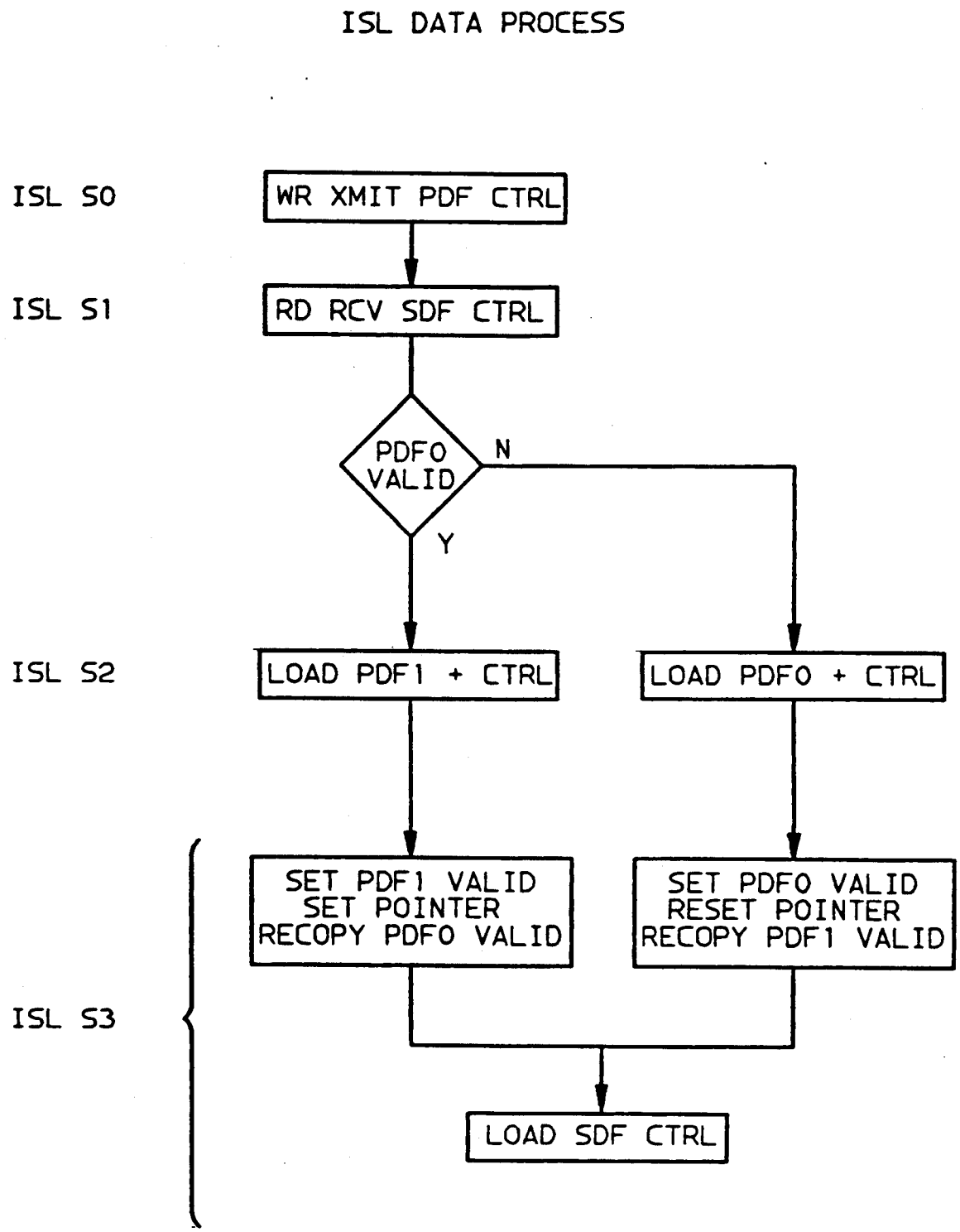
– FIGURE 8 –

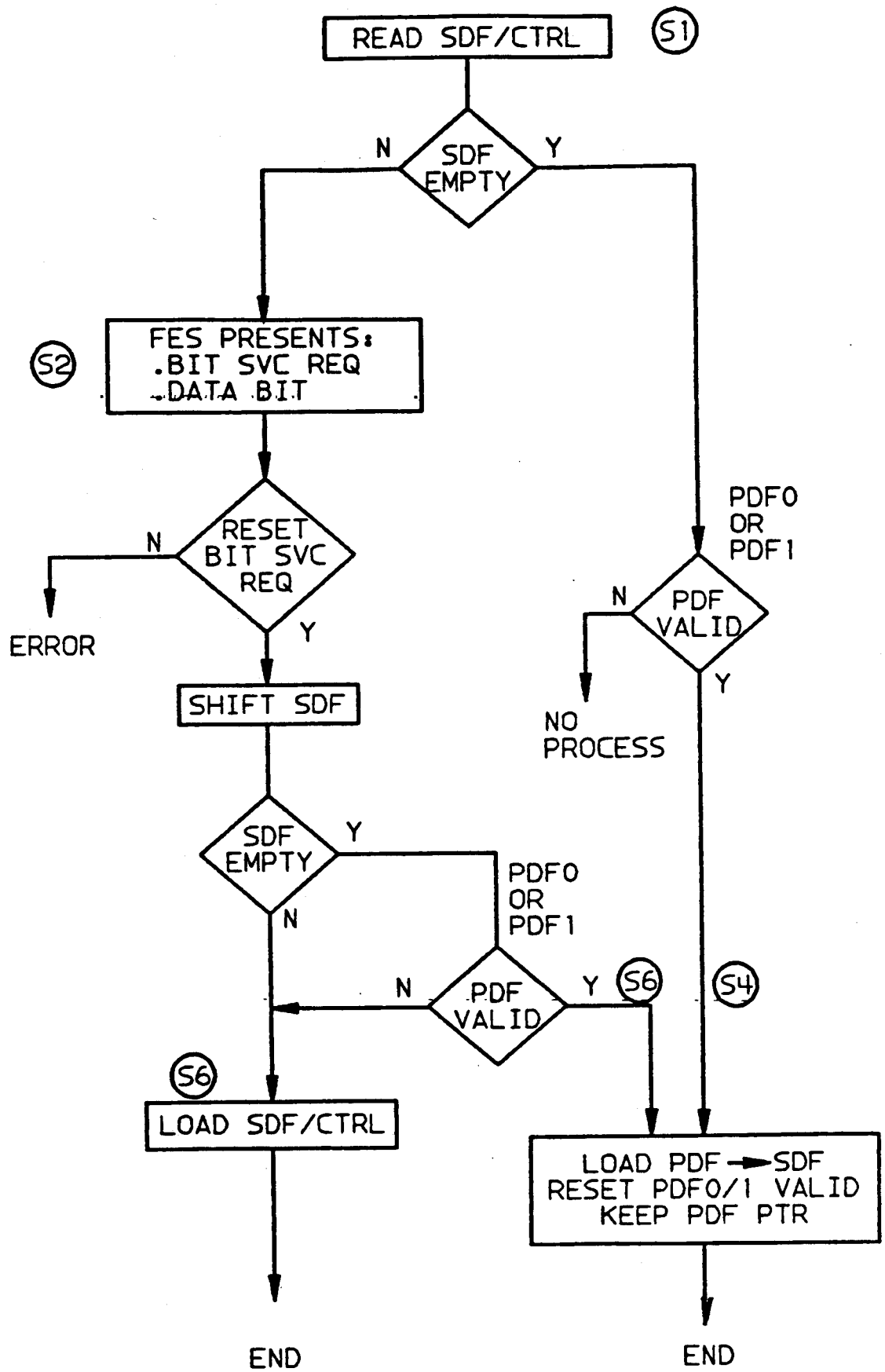
- FIGURE 9 -

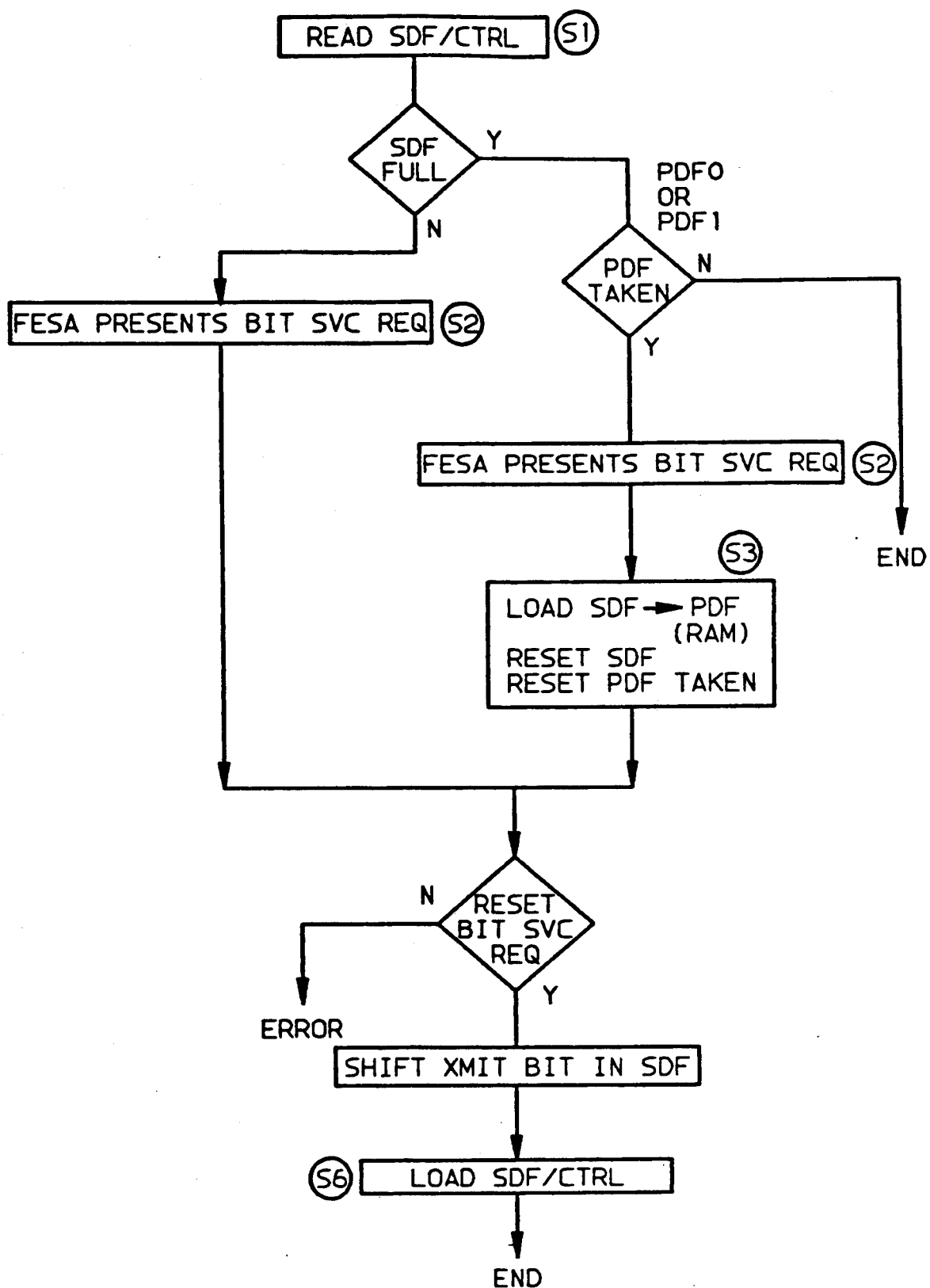
- FIGURE 10 -

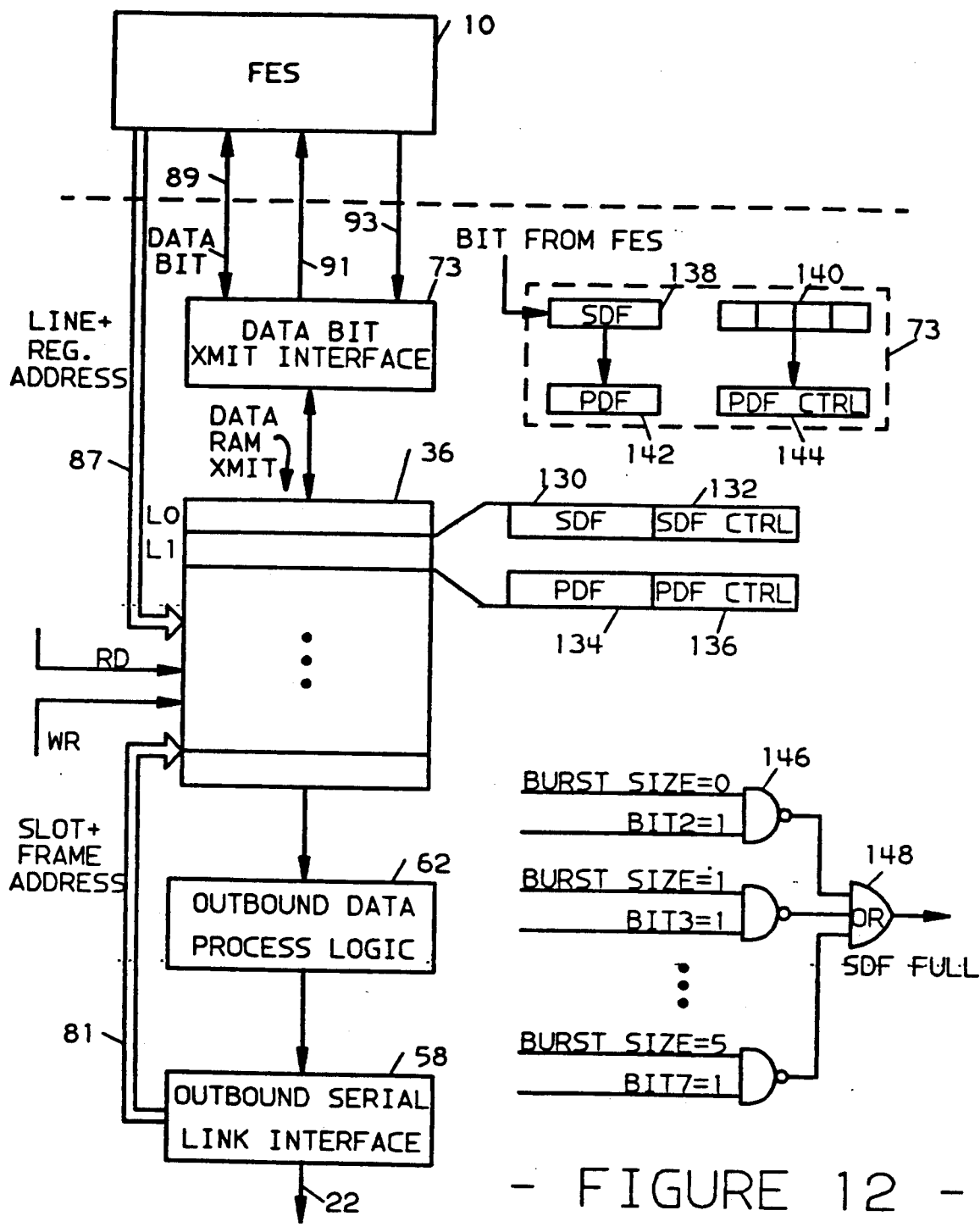
— FIGURE 12 —
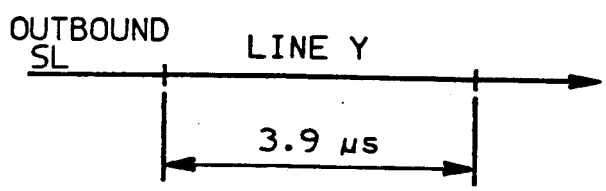
— FIGURE 11 —

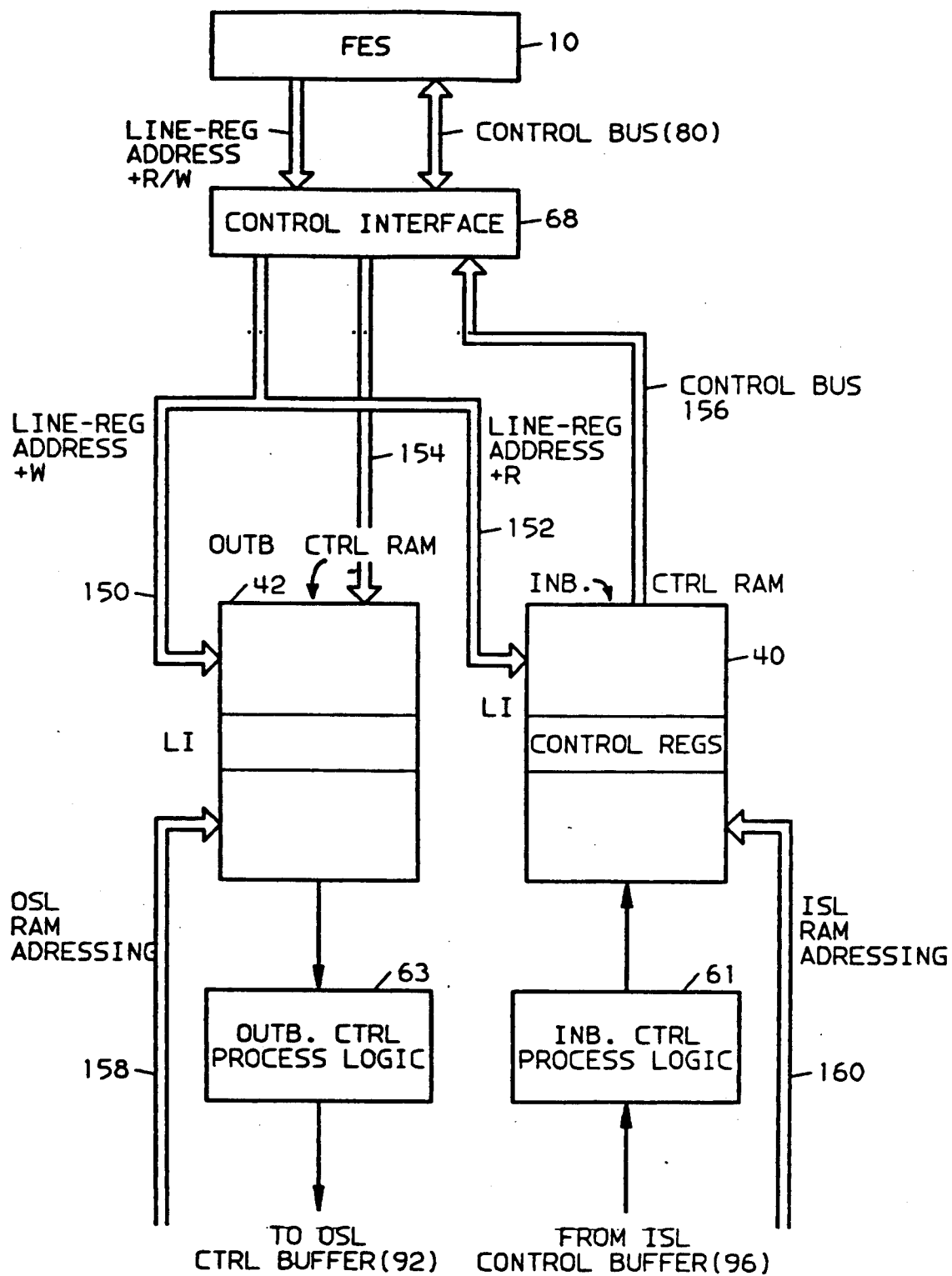
- FIGURE 13 -

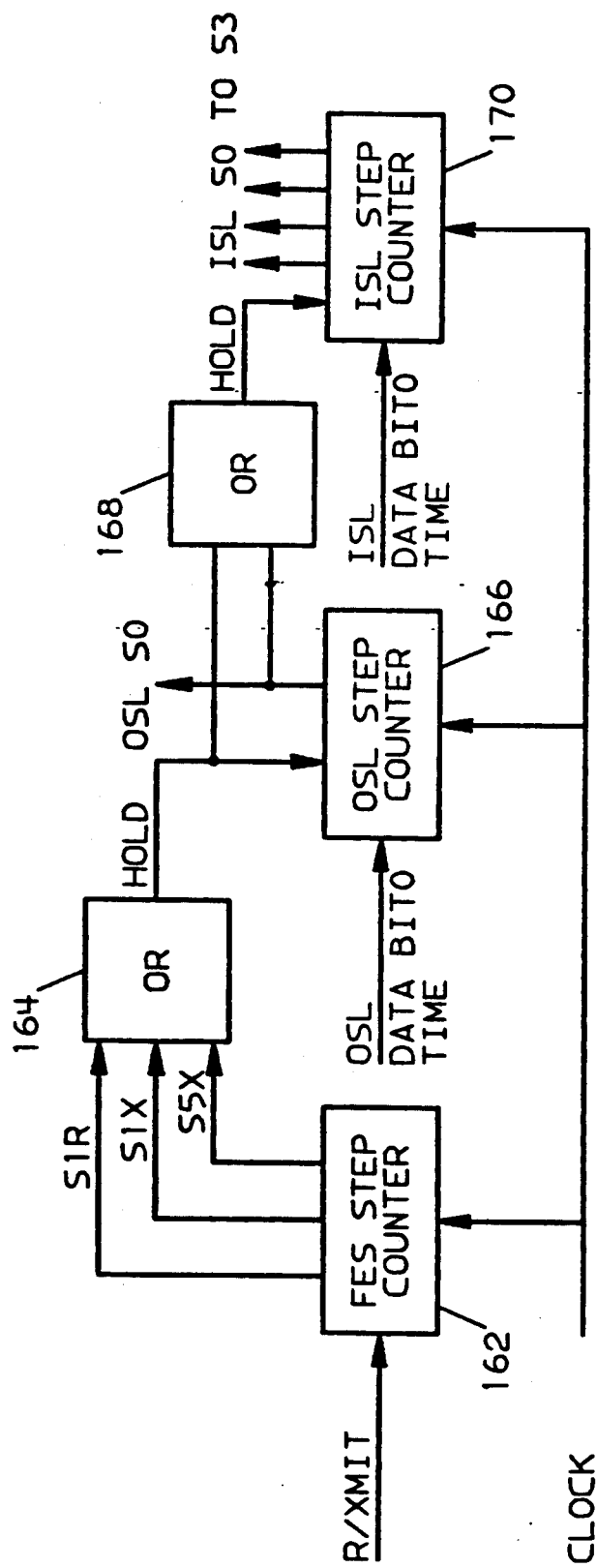
- FIGURE 14 -

SCANNER INTERFACE FOR THE LINE ADAPTERS OF A COMMUNICATION CONTROLLER

FIELD OF THE INVENTION

The present invention relates to the line adapters of a communication device, especially a communication controller. Communications controllers are used for managing transmissions within a teleprocessing environment in which a plurality of user's terminals are connected through transmission lines.

BACKGROUND ART

The main objective of line adapters is to allow groups of transmission lines to exchange information with the Central Control Unit (CCU) of the communication controller, thus avoiding the necessity of connecting each line individually to said CCU. Therefore the line adapters include scanning means for cyclically scanning the lines. Such a line adapter has already been described in commonly-assigned, copending Patent Applications EP-A-0,048,781 and EP-077,863. In said line adapter, the transmission lines connected to the user terminals exchange information with the scanning means through line interface circuits (LICs) regrouped on a LIC unit. Each LIC unit can include up to eight LICs and is connected to the scanning means by a parallel bus and adequate connectors. These connectors have quite a large size and are accordingly space consuming in the machine and are expensive.

Thus, due to the parallel bus between the LICs and the scanning means, the connectivity of the communications controller is limited.

These drawbacks have been removed, as explained in Patent Application EP-0,232,437, by multiplexing the information exchanged with the LICs and transmitting it through a serial synchronous link implemented between the LICs and the line scanning means (called Front End Scanner FES in the cited applications) of each line adapter of the communications controllers.

Thus, due to the serial link, the LIC units and multiplexer interfaces can be, if necessary, implemented outside of the Communications Controller machine frame or at it's periphery; accordingly, the connectivity, LIC switchability and overall performances are increased.

However, the introduction of a serial link into the line adapters would normally require an important modification of the scanning means hardware and microcode. It may be far more interesting, from a technical and economical point of view, to keep the known scanning means and scanner microcode and to introduce between said scanning means and the serial link, an appropriate interface.

In the present invention the FES is the master device from which the FESA must immediately take the information presented by the FES. Similarly, when the FES requires information from a given line X, the FESA must have this information ready for it.

OBJECT OF THE INVENTION

It is therefore an object of the present invention to provide an improved interface (called the Front End Scanner Adapter, or FESA in all further discussion herein) able to adapt the parallel interface of the Front End Scanner (FES) (as implemented, e.g. in the IBM 3725 Communications Controller) to the serial interface of a serial link.

More generally, it is a further object of the invention to provide the line adapters with an improved FESA interface allowing the FES, the serial link and the scanner microcode of the FES to have a time-shared access to the information transmitted through the FESA, even if the FES and the serial link work with asynchronous timings.

SUMMARY OF THE INVENTION

According to the invention, the line adapter (1) includes a FESA interface (11) for interfacing the cyclic scanning means (FES) and the serial link connected to the LICs, so that both the FES and the serial link can work with their own timings. The FESA includes therefore storage means for storing temporarily, on the one hand, data and control information transmitted from the LICs to the FES through the inbound serial link, and on the other hand, data and control information transmitted from the FES to the LICs and teleprocessing lines through the outbound serial link.

The access of the FES and the outbound and inbound serial links to the storage means is time-shared and granted by an arbitration logic according to the relative priorities of operation of said elements within the line adapter of the communications controller.

BRIEF DESCRIPTION OF THE DRAWINGS

FIG. 3 represents schematically the information exchanges between the FES and Serial Link.

FIG. 5 represents a schematic block diagram of the FESA interface.

FIG. 6 represents the structure of the FESA for data transmitted from the serial link to the FES.

FIG. 8 represents the steps of the inbound serial link data process.

FIG. 9 represents the operations needed for transmitting data from the FES to the FESA.

FIG. 10 represents the operations needed for transmitting data from the FESA to the FES.

FIG. 11 represents the structure of the FESA for data transmitted from the FES to the serial link.

FIG. 12 represents a logic circuit for detecting full data slots.

FIG. 13 represents the structure of the FESA for transmitting control information between the FES and the serial link.

FIG. 14 represents an arbitration circuit giving selective access to the data RAMS.

DETAILED DESCRIPTION OF THE INVENTION

Figure 1:
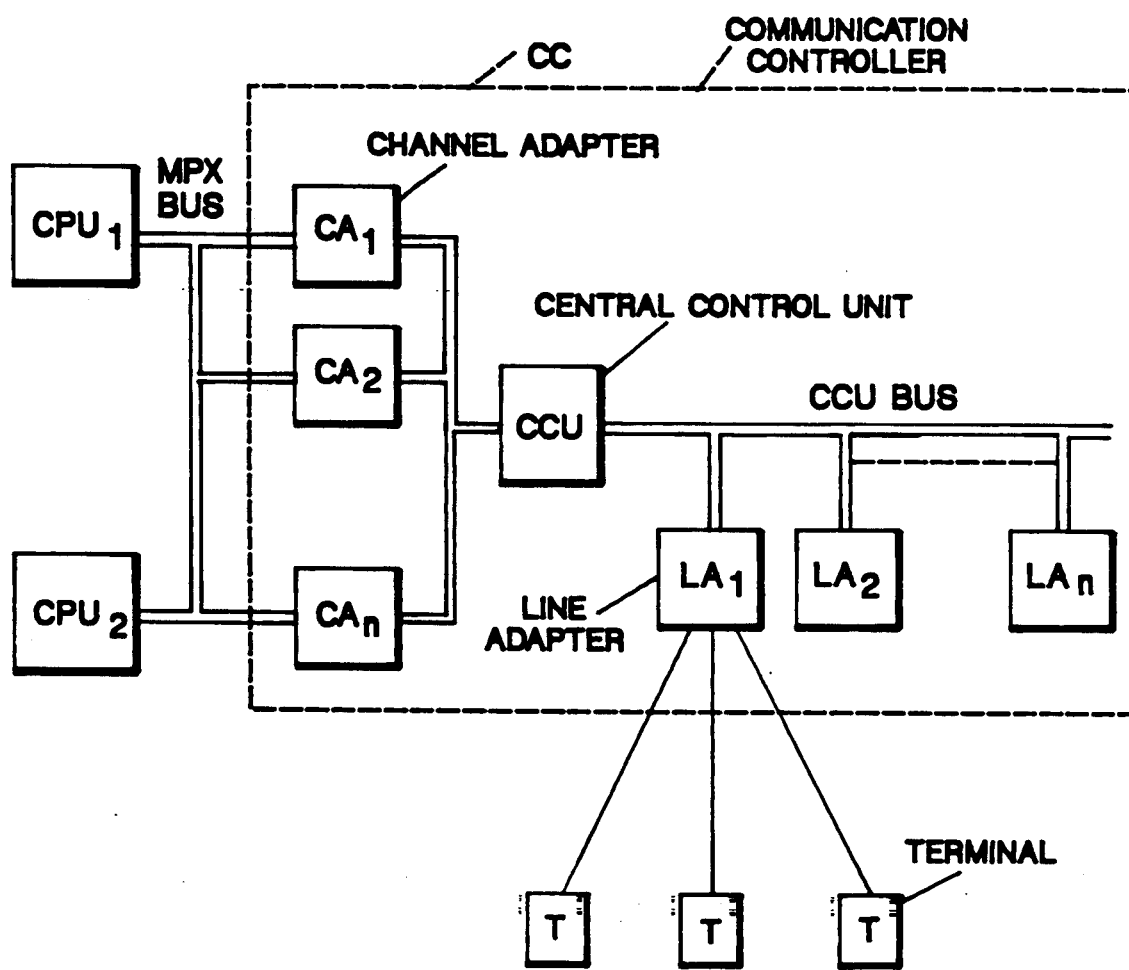
FIG. 1 represents a schematic block diagram of a prior art system wherein the invention may be used.

FIG. 1 illustrates a global scheme of a systems which can use this invention. Communication Controller CC is an element of a teleprocessing network of a type disclosed in the book "Tele-informatique" by G. Macchi and J. E. Guilbert, 1979, published by Dunod, more specifically, under chapter 10. In the communications controllers, a central control unit CCU handles the data transmitted between terminals T and central processing units CPU1 and CPU2. Unit CCU is connected to multiplex channel (MPX) buses for the central processing units CPU1 and CPU2 via channel adapters CA1, ..., CAn. It is also coupled to terminals T via line adapters LA1, ..., LAn connected to a CCU bus.

Figure 2:
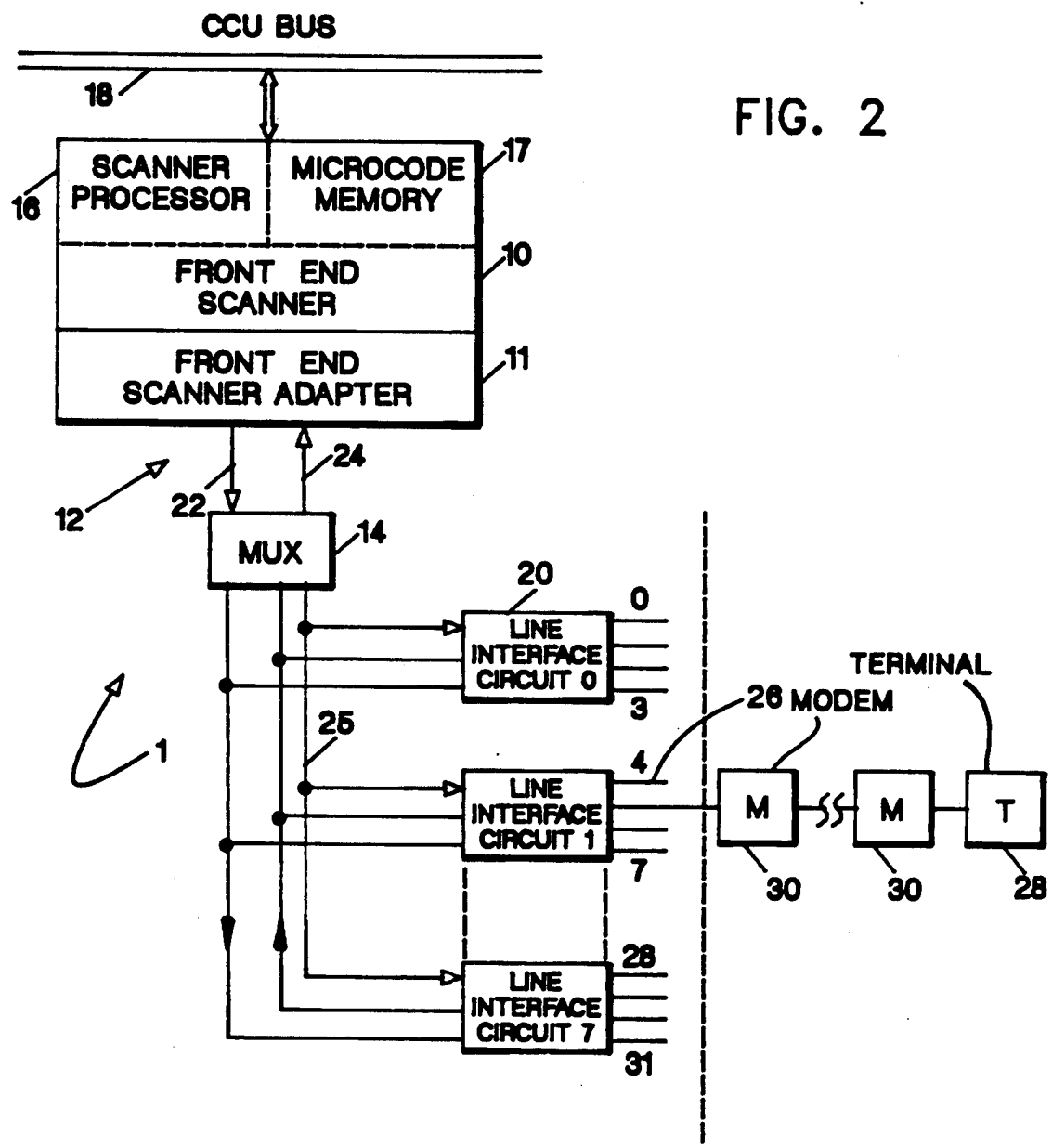
FIG. 2 represents schematically the transmission subsystem of a communication device, incorporating the FESA interface according to the invention.

FIG. 2 is a schematic diagram of an improved line adapter as connected in a system and referenced as LA in FIG. 1. Such an improved line adapter (1) is comprised of a microprocessor (16) running the microcode contained in a microcode memory (17), and of a scanning logic (10) designated by FES (10) (Front End Scanner) in the Figure, details of which are available in European Patent Application No. EP-A-0,048,781 related to a communication line adapter for a communications controller.

In said patent application, the data received or transmitted by user's terminals T over the transmission terminals and the line interface circuits (LICs) were exchanged between the scanning means and LICs through a parallel bus.

In the present invention, which concerns a FESA interface (11) between the FES (10) and the line interface circuits (LICs), the data exchange between the LICs (20) and the scanning means will preferably be done through a multiplexing circuit (14) and a serial link (12) as further described.

In addition to the FES (10) and the serial link (12) and multiplexing circuit (14), the line adapter according to the invention includes a Front End Scanner Adapter FESA (11) for adapting the parallel interface of the FES (10) to the serial link architecture as further described with reference to FIG. 5.

According to the invention, the FESA (11) must be transparent to the FES. This means that the FES (10) performs its scanning operations as it did when it was connected to the LICs by a parallel bus, as described in the aforementioned patent applications EP-A-0,048,781 and EP-A-077,863.

The scanning timing of the FES is briefly set out in FIG. 3 : the scanning of a given line X includes a receive phase and a transmit phase, each of which comprise seven steps (0 to 6) provided by a sequencing logic (not shown). When the scanning of line X is finished, it is normally followed by the scanning of line (X+4).

However, the synchronous scanning protocol of the FES can be interrupted at the end of line scanning by an asynchronous operation of the microcode, the latter wanting immediate read or write access to a LIC register.

FIG. 3 gives an idea of the problem of asynchronism that must be solved by the invention; while the FES performs the scanning of line X, the outbound serial link (OSL) works on information to be transmitted to a line Y, and the inbound serial link (ISL) works on information received from a line Z.

Furthermore, while the FES scanning takes typically 2.8 microseconds per line, the time assigned to lines Y and Z for outbound and inbound serial link processing is 3.9 microseconds, the ISL and OSL being further shifted by a constant delay, d.

Thus, the main problem to be solved by the FESA (11) according to the invention is the problem of asynchronism between several components connected to it which need to be able to exchange information. Since it is implemented between the FES (10) and the serial link (12) of the line-adapter (1), the FESA has to meet the requirements of four independent users : the FES hardware, the FES microcode, the outbound serial link, and the inbound serial link. Therefore, as will be further described, the FESA will include storage means between the FES (10) and the serial link (12), said storage means being preferably embodied by data RAMs (36, 38) and control RAMs (40, 42) as shown in FIG. 5. In FIG. 3, the different arrows show the possible information flows between the slots of the serial link and the RAMs and the possible information flows between the RAMs and the FES. These information flows require the implementation of interfacing logic further described.

Another problem to be solved by the FESA is that of arbitrating the priorities of access to the RAMs (36, 38, 40, 42) by the various users. This is performed in the present invention by an arbitration logic (100) also further described.

Although cited problems and solutions can easily be generalized, they will be described herein, for more clarity but without restricting the invention, as related to a FES (10) like those included in the line adapters of an IBM 3725 Communications Controller, as described in patent application EP-A-0,048,781.

Further, the FESA design must not impact the FES performance. The FESA must handle the FES and microcode requests (which will be briefly recalled further) as they are handled in the IBM 3725 design; this means that these FES and microcode requests are served with the highest priority by the FESA while the outbound and inbound requests of the serial link receive a lower priority.

The principle of the FES scanning mechanism will be reviewed in relation to FIGS. 2 and 3.

FIG. 2 shows that the FES/FESA is connected, for instance, to eight Line Interface circuits (LICs) (20) through a serial link (12) and a multiplexor (14). Each LIC supports up to four serial transmission lines (26), each connected to a user terminal T (28) through modems M (30).

As described in previously mentioned patent applications EP-A-0,048,781 and EP-A-0,077,863, each line adapter includes a scanning device performing the scanning of the lines according to a certain sequential scanning scheme as follows: In synchronous operation mode, the time interval between two line scans must be shorter than the time interval between two bits which are transmitted or received. In the example described, the maximum scanning speed of the device of the invention is 350 000 received or emitted bits per second (transmission through four wires also called "full duplex" transmission). This scanning power is automatically distributed amongst the number of connected lines. If there is one line, it would be able to operate at 256 000 bits per second. If there are four lines, they would be able to operate at 64 000 bits per second and if there are thirty two lines, they would be able to operate at 9600 bits per second. As stated above, the lines are connected to the scanning device through line interface circuits (LIC). In a preferred embodiment, each LIC circuit can be connected to one or four lines. It is possible to have one to eight LIC circuits, each one being provided on a so-called LIC card and connected to a scanning device. The number of the LIC circuits which are connected automatically modifies the line scanning. When eight LIC circuits are installed in the 0 to 7 order, the line scanning is always performed in the following order by the FES as described in said patent applications:

The first line (line 0) of the first LIC, the first line of the second LIC, etc., the first line of the last installed LIC, then the second line (line 1) of the first LIC, the second line of the second LIC, etc., the second line of the last installed LIC, then the third line (line 2) of the first LIC, etc., the third line of the last installed LIC and at last, the fourth line (line 3) of the first LIC, etc., the fourth line of the last installed LIC and we come back to the first line of the first LIC. If there is only one line on a LIC circuit, said one line will be scanned four times more often than the other lines. Of course, the FESA according to the present invention could easily be adapted to a FES having another scanning scheme.

Interfacing between FESA and FES

The FESA includes interfacing logic (68, 70, 72) connected to the FES as will be further described in relation to FIG. 5. It has to be noted that, since the FES (10) is not affected by the presence of the FESA, it presents the normal interfacing wires, as described in patent EP-A-0,077,863, the most important of which are hereunder recalled :

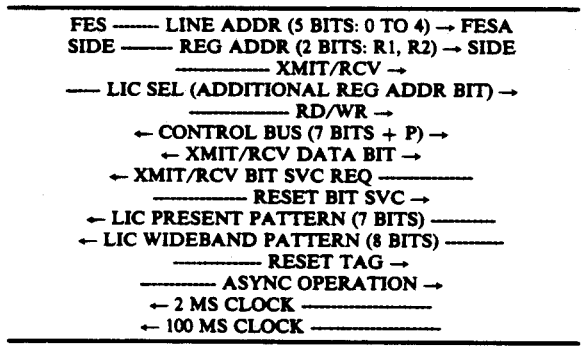

ASYNC OPERATION is a new timing tag. It signals asynchronous microcode operations on the FESA or on the line frame components.

The function of these interfacing wires will become clear farther in the specification.

Interfacing between FESA and Serial Link (SL)

The FESA according to the invention also provides interfacing means (60, 61, 62, 63) connected to the serial link (12). For a better understanding of said interfacing means, it is necessary to first describe the serial link architecture, in relation to FIG. 4.

Figure 4B:
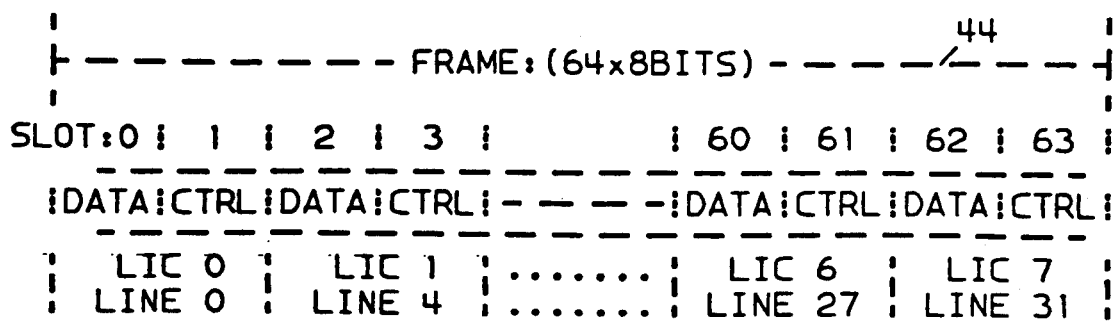
FIG. 4, consisting of portions 4a, 4b and 4c, represents the structure of the serial link information flow.

As shown in FIG. 4b, the serial information is spread in both directions over contiguous frames (44).

Inside each FRAME 44, 2 eight-bit slots are dedicated to each piece of attached equipment, one slot for data exchange, one slot to pass control information.

A SUPERFRAME is a sequence of 32 FRAMES used to exchange up to 32 different pieces of control information with the 32 equipments attached through 32 transmission lines.

A given FRAME transfers the same kind of control information for all the 32 equipments.

Figure 4A:
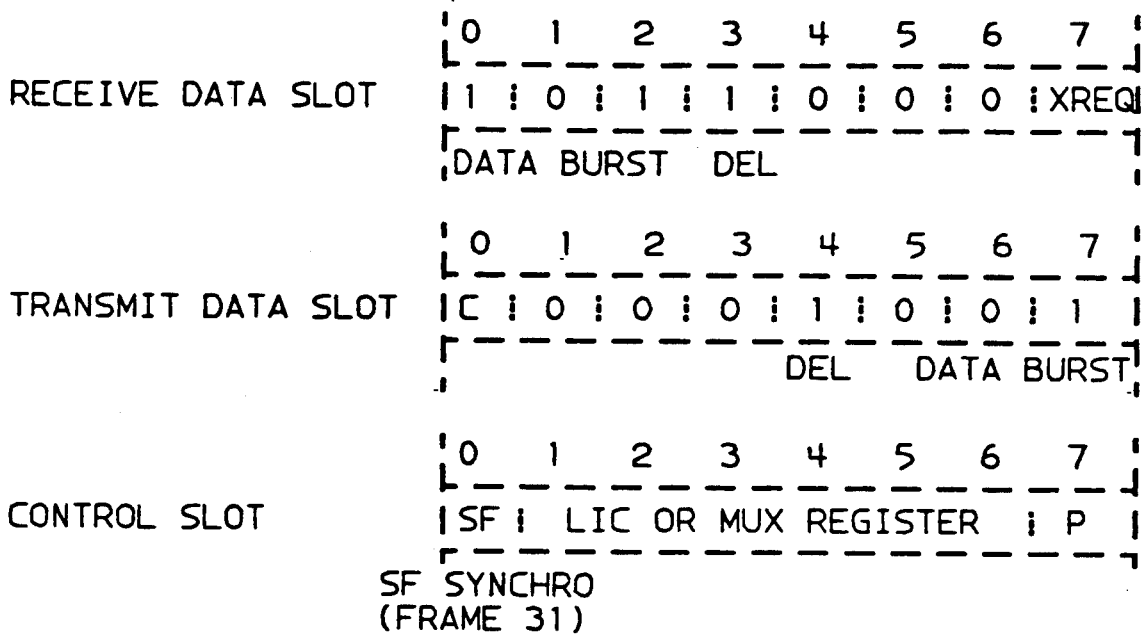
Figure 4C:
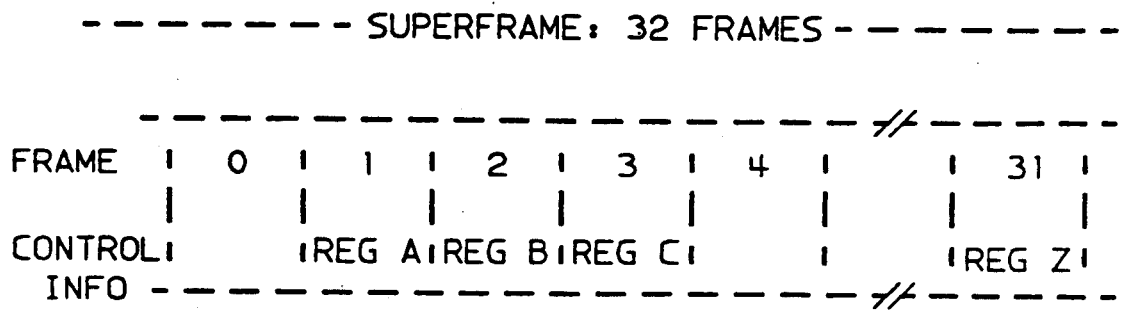

FIG. 4c shows the FRAME and SUPERFRAME assignation in the present specification, where a centralized scanner controls 32 teleprocessing lines. In this SUPERFRAME organization, all frames are devoted to a determined control register of one of the LIC, multiplexor or line registers, it being understood that the 32 line interface equipments are implemented in 8 Line interface couplers (LIC's) of 4 lines each.

The data slot contents (Data Burst) do not depend on the frame number and are represented in FIG. 4a. Depending on the data traffic, the data burst can vary from 0 to 5 bits.

To simplify the hardware at the line interface level, the data slot organization is not the same in both directions (Rcv and Xmit) :

In the receive (RCV) data slot, the valid data bits field is limited at the left by a '1 delimiter' followed by zeros up to bit 6. A receive data slot bit 7 (XREQ) is set by the transmit part of the line interface equipment to request transmit data from the scanner.

In the transmit data slot, the valid data bits field is limited at the right by a '1 delimiter' and zeros are set before the delimiter up to bit 1. A transmit data slot bit 0 is set by the scanner to send modem control information (clear or ready to send) associated with the data burst (C=Control bit in X21 transmission mode).

The control slot format is the same in both ways :

The control information is set in bits 1 to 6. Bit 0 is set to '1' in all control slots of FRAME 31 to allow the two ends of the serial link to check and keep the superframe synchronization.

On the serial link, bits are encoded according to the differential Manchester code.

A specific code violation pattern is sent at each end of the frame by each sending part to allow the opposite receiving part to detect the beginning of the next frame.

At a transmission rate of 4 MBPS, the frame duration is 125 microseconds and a superframe lasts 4 milliseconds.

FESA RAMS

To solve the problem of asynchronism between the four FESA users (inbound serial link, outbound serial link, FES and FES microcode), each of which is working with its own timing, RAMs (36, 38, 40, 42) as previously mentioned are implemented in the FESA (11) according to the invention. Those RAMs are temporary storage means which allow the buffering of Data and Control information from or to the lines (26).

The general data flow between the FESA and its users, and within the FESA (11) itself, is shown in FIG. 5. In FIG. 5, the data and control busses are represented by single lines for more clarity and the interfaces between FESA and FES (10) or serial link (12) being respectively represented by dotted lines (52, 54). The different building blocks of the FESA (11) will be explained with more detail herein.

Concerning the general data flow of the FESA, it is to be noted that the data and control slots taken from the inbound serial link (12) are transmitted by bursts to the inbound serial link interface (56), and are then processed according to the steps provided by a process logic (60, 61). Thus, the data are put in appropriate form for storage in a "Receive Data RAM" (38), where they are kept ready for a bit after bit scanning by the FES through a data bit interface (70). The control data slots provided by the inbound serial link are similarly put in appropriate form for storage in an "Inbound Control RAM" (40), while some specific control registers (LIC present, LIC wideband) directly needed by the FES or microcode are transmitted directly through line (71), to a scan control logic (72), described in relation to FIG. 13.

When data or control information, provided by the FES according to its own timing, is to be transmitted to the serial link (12) to be output to the LICs and users lines, said data and control information is, respectively, loaded into a "Transmit Data RAM" (36) and an "Outbound Control RAM" (42). This is respectively done through a data bit transmit interface (73) and a control interface (68). Once loaded into transmit data RAM (36), the data information to be transmitted to the LICs through the OSL for outbound transmission will be processed by the outbound data process logic (62) and the outbound serial link interface (58).

On the other hand, once loaded into the outbound control RAM (42), the control information to be transmitted to the LICs through the OSL is ready for outbound transmission performed by the outbound control process logic (63) and the OSL interface (58). The control process logic (63) is in charge of fetching the control words from the outbound control RAM and therefore provides necessary timing signals.

More details about process logic (61), OSL interface (58) and corresponding operation timings will be provided herein. However, it is to be noted that the information available in the transmit data RAM (36) and the outbound control RAM (42), which correspond to information to be transmitted to a given line, are taken by the OSL when it presents the data and control slots corresponding to that very line.

The inbound information flow obeys similar rules. Once presented by the ISL through the inbound serial link interface (56), the information slots of a given line (data + control) are processed by an inbound data process logic (60) and an inbound control process logic (61), respectively. Thus, the data and control information of said line are put in adequate form and respectively stored in a receive data RAM (38) and an inbound control RAM (40). There they are kept available for transmission to the FES (10) through a receive data bit interface (70) and the control interface (68). The transmission to the FES occurs concurrently with the next "Receive" scanning of the FES for the considered line.

Of course, since the FES (10), the inbound serial link (24), the outbound serial link (22) and the scanner microcode all work with asynchronous timings, their relative priority for acceding to the RAMs (36, 38, 40, 42) must be arbitrated according to the priorities wanted within the line adapter (1).

Therefore, according to the invention, arbitration means (100) are provided. They do not appear on FIG. 5, but will be described in FIG. 14.

FIG. 5 further shows a FESA control register unit (66), which exchanges control information with the FES control bus (80) through the control interface (68). A variety of control registers can be included in the unit 66: error reporting registers, FESA diagnostics registers etc.., but they are not really part of the present invention.

Thus, the control register unit mainly contains a FESA control register, each bit of which is used for controlling a specific operation mode of the FESA. The possible operation modes of the FESA are indicated below.

The FESA can, under reset, be in "reset RAMs" state, in Freeze state, or in "free-running" mode, which allows the FESA normal operation.

RESET FESA

Reset FESA is a control lead coming from the FES, active during the FES reset (cf FES/FESA interface).

In the FESA, this command resets all the logic (reset latches, including the control Reg bit 0), but sets the control Reg bit 1 (reset RAMs), in order to initialize the reset of the FESA RAMs when reset FESA becomes inactive at the interface.

At completion of reset RAMs, the FESA works in a mode called "free-running mode".

When the FESA is under reset, it does not generate signal transitions on the outbound signal link. This lack of transitions is decoded by the MUX (14) as a reset command.

FESA RESET LATCHES : (bit 0 of control register)

This reset is activated by microcode, by setting the FESA control Reg bit 0.

It allows to reset the FESA independently from the FES.

This command has the same characteristics as reset FESA, except that :
control Reg bit 0 remains ON during the reset.
control Reg bit 1 is not set automatically by hardware.

"Reset latches" mode is ended by the reset of bit 0 by microcode.

Next state can be "reset RAMs", "Freeze", or "free running", depending on the bits set or not set by microcode in the control Reg at the time it removed reset of latches.

FESA RESET RAMS : (bit 1 of control register)

The FESA reset RAMs can be started :
either automatically at the end of reset FESA (FESA control Reg bit 1 is set by the hardware).
or by microcode (set bit 1), while resetting control Reg bit 0.

The operation resets all FESA RAMs.

At the end, the FESA passes to the free-running mode (control Reg bit 1 is reset automatically), or to freeze mode, if the control Reg bit 2 (Freeze) has been set by the microcode at the time it reset bit 0.

FESA FREEZE : (bit 2)

In this state, the FESA functions are disabled and the serial link is not operational (transmission of idle ones).

However, the FESA RAMs can be loaded or dumped.

Freeze is fully controlled by microcode by the setting and resetting of the control Reg bit 2.

If bit 1 and 2 are set while resetting bit 0, Freeze becomes effective in the FESA when the reset RAMs operation is completed.

To pass to the free-running state, the microcode must reset freeze. However, the free-running state will be correct (serial link synchronized) only if the following sequences are respected :
Reset Latches, reset RAMs, Freeze or
Reset Latches, Freeze If the FESA has been stopped by Freeze while free-running, it cannot be restarted by removing directly Freeze.

Another restriction on Freeze is that the microcode accesses to the FESA can only be programmed :
if both FES and FESA are in Freeze mode. or
if both FES and FESA are in free-running mode.

Two further bits (3, 4) are provided, respectively called "control RAMs address extension bit" and "control RAMs swap" bit, described further below.

FESA Information Flow

The different information (data, control) flows as previously mentioned will now be described with more detail in relation to the corresponding hardware.

FIG. 6 shows the structure of the FESA hardware for inbound data transmission, i.e. data transmitted from ISL line (24) to the FES (10), through inbound serial link interface (56), inbound data process logic (60), receive data RAM (38) and receive data bit interface (70).

The data RAMs (36, 38) contain, for each line, receive (RCV) and transmit (Xmit) data buffers plus a set of control bits.

In the receive operation, the FESA receives data bursts from the lines through the Inbound S.L. data slots (shown in FIG. 4) and serializes the data to feed the FES bit by bit.

If 32 lines are to be connected to a line-adapter (1), the data RCV RAM (38) needs 32 areas (L0 to L31) of 4 bytes each, a RCV SDF byte (74), a RCV SDF CTRL byte (76), a RCV PDFO byte (78) and a RCV PDFI byte (82), where SDF stands for "Serial Data Field" and PDF stands for "Parallel Data Field".

The cited RAM fields are working areas for the FESA to assemble or serialize the data bursts in a way described herunder.

It is to be noted that there is no fixed RCV Data Burst size. Each LIC fills its assigned Data Slots with the data available at the time the Inbound S.L. scans its line(s).

Thus, the RCV data burst length depends upon the line speed. The burst length can vary from 0 to 5 bits with the serial link used in the present invention. However, a similar serial link using bursts of constant length could work with the FESA provided by the invention.

The inbound S.L. data slots are processed by the FESA in the following way :

The Xmit data burst request (if any) (bit 7 of receive data slot, FIG. 4A) is saved into the data RCV RAM (38) in the Xmit control 2 field (FIG. 8), for next Xmit operation, along with the "line enabled" information coming from the inbound CTRL RAM, as described in relation to the control RAMs management.

The RCV data bits are shifted to the right by the inbound data process logic (60) and the one delimiter is set at the left of the data bits in order to prepare the shift of the bits to the FES (10).

The table shows an example of content of the bytes (74, 76, 78, 82) content, where Ri designs a received bit number i.

| BYTE SDF (74) | | | | | | | BYTE SDF CTL (76) | | |
|---|---|---|---|---|---|---|---|---|---|
| Bits: | 0 | 1 | 2 | 3 | 4 | 5 | 6 | 0 | 1 | 2 |
| | 0 | 0 | 0 | 0 | 1 | R0 | R1 | PDFO Valid | PDFI Valid | PDF PTR |

| BYTE RCV PDFO (78) | | | | | | | |
|---|---|---|---|---|---|---|---|
| Bits: | 0 | 1 | 2 | 3 | 4 | 5 | 6 |
| | 0 | 0 | 1 | R0 | R1 | R2 | R3 |

| BYTE RCV PDFI (82) | | | | | | | |
|---|---|---|---|---|---|---|---|
| Bits: | 0 | 1 | 2 | 3 | 4 | 5 | 6 |
| | 0 | 0 | 0 | 1 | R0 | R1 | R2 |

The bit 0 of byte SDF CTL (76), called PDFO valid, means, when set to "1", that the PDFO has been set with a data burst coming from the Inbound Serial Link. Thus, before loading a new data burst into one of the two PDF fields, the ISL must monitor the PDFO valid bit and the PDFI valid bit in order to determine which PDF field should be loaded with a new data burst. This is done by an update logic (88) as described below. The bit 1 of same byte, called PDFI, has a similar meaning. The bit 2 of same byte, called PDF PTR (pointer), points to the PDF (0 or 1) to be loaded into the SDF shift register (84).

Figure 7:
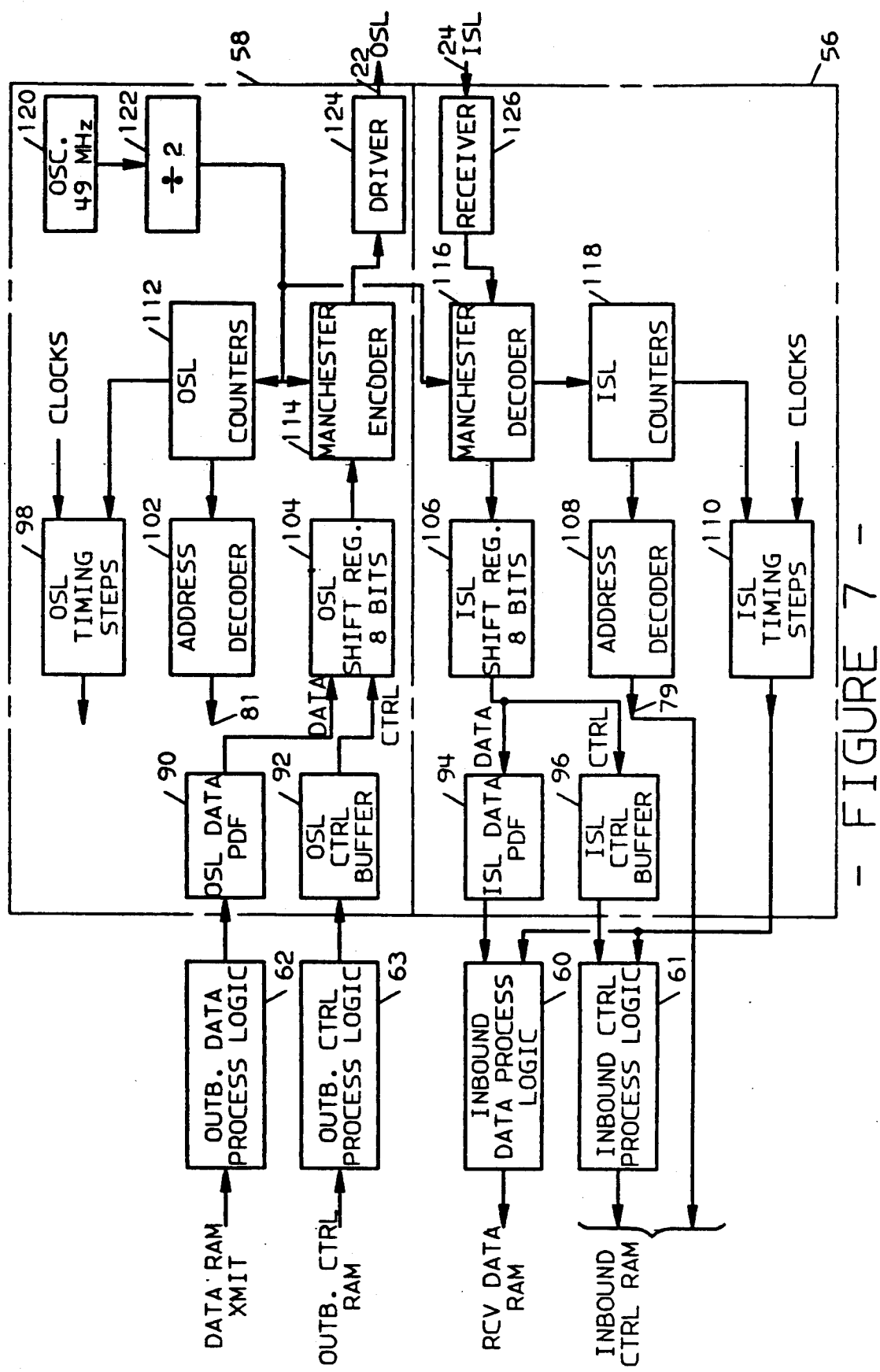
FIG. 7 represents the structure of the interface of the FESA with the serial link.

FIG. 8 shows a sum-up of the operations performed by the ISL data process logic (60), according to several ISL steps (ISL S0 to S3) generated by an ISL timing steps generator (110), as described further herein in FIG. 7.

As represented in FIG. 8 :

After ISL step S0, which writes the Xmit PDF CTRL (transmit data burst request) into the transmit data RAM as previously mentioned, at step S1, the process reads the RCV data SDF CTRL in order to check whether the bit PDFO is valid.

At step 3, if bit 0 is off (PDFO field not valid), the ISL data process loads the new data burst at address PDFO and sets bit 0 on.

If bit 0 is on, the FESA loads the new data burst at address PDFI and sets bits 1 and 2 of the RCV control field in the SDF CTL register (86). Then, the result is immediately loaded into the data RCV RAM (38).

It is to be noted that the address of the RCV data RAM (38) where the processed data burst has to be written, upon activation of WR command, is specified by an address bus (81) containing the slot and frame address of the considered line in the serial link. This address is generated by an address decoder (108) shown in FIG. 7, and receiving its clocking from an ISL counter (118), which provides the slot and frame counts of the serial link.

Once stored in the data receive RAM (38) the data bursts are ready for transmission to the FES (10), bit after bit, through the data bit receive interface (70).

Therefore, the SDF (74) and SDF CTRL (76) are loaded, respectively, into a SDF shift register (84) and a SDF CTRL register (86) both implemented in the data bit receive interface (70).

FIG. 9 shows a sum-up of the operations performed when a SDF (74) stored in the data RAM (38) is to be transmitted bit by bit to the FES.

When the FES scans a line in RCV, it generates a bit RCV service request on line (83) and the FESA provides a data bit to the FES at step S2 by shifting the RCV SDF (74), associated to the line and previously loaded into the SDF shift reg. (84), at step FES S1 (FIG. 9), so long as the SDF is not empty.

If the SDF shift register (84) is empty, the FESA fetches one of the PDF's (PDFO or PDFI if any valid) to reload the SDF (84) shift reg. at step S4 or S6 and resumes the data bit transfer at next FES scan. The FESA process at this time depends upon the RCV control bits previously described. The monitoring and updating of said control bits is made by an update logic (88) composed of simple combinatory logic (AND/OR gates).

The decoding of bits 0, 1, 2 by said update logic (88) leads to the output commands as shown in the table hereunder :

| BIT 0 | BIT 1 | BIT 2 | |
|---|---|---|---|
| 0 | 0 | X | No process |
| 0 | 1 | X | Fetch PDF1. Reset bit 1. |
| 1 | 0 | X | Fetch PDF0. Reset bit 0. |
| 1 | 1 | 0 | Fetch PDF1. Reset bit 1. |
| 1 | 1 | 1 | Fetch PDF0. Reset bit 0. |

It is to be noted that the operation steps S1, S2, S4, S6 shown in FIG. 9 correspond to the same steps of a receive operation performed by the FES (10), as described in patent application EP-A-0,077,863.

Those steps are derived from a FES step counter within the FES. It has been explained that each receive operation performed by the FES is spread over a 7 step period (S0 to S6). Therefore, since the RCV/Xmit signal clock is provided to the FESA at the FES/FESA interface, it is easy to retrieve the same steps within the FESA by division of the RCV/Xmit signal.

FIG. 7 shows the structure of the inbound/outbound serial link interfaces (56, 58). The Manchester encoded information from the ISL line (24) is received through a receiver circuit (126) and buffered to a Manchester decoder (116). Of course, if the information was encoded with another code, the decoder (116) would be accordingly replaced.

All the necessary clocking signals are easily derived from an oscillator (120) working for example at 49 Mhz, said frequency being divided, for better symmetry of the signal, within a divider by two (122).

The decoder (116) provides 8-bit information slots to an ISL shift register (106) and, at each slot, a counting pulse is provided to the ISL counters (118) wherein slot and frame counts are generated.

Since the slots correspond to the lines multiplexed on the serial link, the decodes provided by the address decoder (108) will be used for addressing the inbound control RAM (40) and the data receive RAM (38) (bus (79)).

The first 8-bit slot provided to the ISL shift register (106) is a data slot, and the next one is a control slot, and so on (cf FIG. 4). The data and control slots are respectively transmitted by the ISL shift register (106) to an ISL data PDF parallel register (94) and to an ISL CTRL buffer (96), the discrimination being made upon an eight bit count.

When the data/CTRL slots reach, respectively, the inbound data process logic (60) and the inbound CTRL process logic (61), they are still in a format depending of the format on the serial link (cf FIG. 4 : data bursts include a data field delimiter). Thus, said data slots are processed, i.e shifted in order to be loadable in the data RCV RAM in a form allowing bit after bit transfer to the FES.

However, this processing of the slots may not be compulsory if another format is chosen on the serial link.

The structure of the outbound serial link interface (58) is similar to the inbound one, it being understood that the information slots (data/CTRL) are to be transmitted from the outbound data and CTRL RAMs (36, 42) to the OSL.

The data slots taken from the data Xmit RAM (36) are in the form as provided by the FES and are accordingly processed (shifted) within the outbound data process logic (62) (mainly a shift register), in order to be loaded into the parallel register constituting the OSL PDF (90).

The control information is read from the outbound control RAM and loaded into an OSL CTRL buffer (92) through an outbound control process logic (63) which may be facultative, depending on the format of the control slots as stored in the CTRL RAM.

The data and control slots, still in parallel form, are transmitted alternately to an OSL shift register (104) and accordingly serialized into a Manchester encoder (114), and put onto the OSL line (22) through a driver (124).

It is to be noted that, as in the inbound direction, OSL slot and frame counters (112) are implemented. The slot/frame counts are used by an address decoder (102) which has to feed the Xmit data RAM (36) with the slot and frame addresses (FIG. 11, bus 81), and by an OSL timing step generator (98).

FIG. 11 shows the global structure of the FESA hardware for outbound data transmission, i.e data transmitted from the FES (10) to the OSL line (22), through a data bit Xmit interface (73), a Xmit data RAM (36), the outbound data process logic (62) and outbound serial link interface (58) as previously described.

In the Xmit operation for each scanned line, the FESA requests data bits from the FES to assemble a Xmit data burst according to the burst size specified by microcode for each line in the data RAM. It then sends the data burst to the line on the outbound S.L., in the data slot assigned to the line, on LIC request.

The Xmit data RAM (36) contains, for each of the 32 lines, an SDF byte (130) and its related SDF CTRL byte (132), and a PDF (134) byte and its related control byte PDF CTRL (136).

The content of said bytes is shown in the table hereunder, the Xi in the data bytes representing a data bit i transmitted by the FES (10) through the data bit transmit interface (73).

| BYTE SDF (130) | | | | | | | BYTE SDF CTRL (132) | | |
|---|---|---|---|---|---|---|---|---|---|
| C RTS | X1 | X0 | 1 | 0 | 0 | 0 | PDF TAKEN | 0 | BURST SIZE |
| Bits: 0 | 1 | 2 | 3 | 4 | 5 | 6 | 0 | 1 | 2 to 4 |

| BYTE PDF (134) | | | | | | | BYTE PDF CTRL (136) | | | |
|---|---|---|---|---|---|---|---|---|---|---|
| C RTS | X4 | X3 | X2 | X1 | X0 | 1 | XREQ REMB | 0 | LINE ENAB | 0 | 0 |
| Bits: 0 | 1 | 2 | 3 | 4 | 5 | 6 | 0 | 1 | 2 | 3 | 4 |

Bits 2 to 4 of the SDF control byte (132) in the Xmit data RAM (36), specify the XMIT burst size with the following encoding :

| BURST SIZE VALUE | | | DATA BITS PER SLOT |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |

The operations performed within the data bit Xmit interface (73), according to working steps derived from the FES step S0 to S6, are summed up in FIG. 10.

As represented in FIG. 10:

At step S1 (FES), the SDF field (130) is loaded into the SDF register (138), and its content is checked. So long as SDF register (138) is not full, the FESA presents on step S2 a bit service request (wire 91) to the FES by means of the data bit transmit interface (73). The FES sends a data bit on wire (89) at step S3 and raises a reset bit service request signal (wire (93), FIG. 11).

The transmit data bit is assembled in the transmit SDF field (138).

If SDF (138) is full, (burst size reached), there are two possibilities:

if PDF taken bit within SDF CTL reg. (140) is off (i.e. OSL has not yet taken the PDF (134) from the RAM (36)), there is no process to do.

if PDF taken bit is on, the FESA presents a bit SVC request at step S2 to get a new Xmit bit from the FES. At step S3, the SDF (138) is loaded into the PDF (142) then into the PDF field (134) of the RAM (36). The SDF reg. (138) is reset for determining the burst size for next line, as described farther. Finally, the "PDF taken" is reset. The "transmit bit", just obtained from the FES, is shifted in the SDF reg. (138) and, at the step S6, the SDF reg. (138) is loaded back into the SDF field (130) of data transmit RAM (36).

It is to be noted that a simple circuit included in interface (73) is provided, as shown in FIG. 12, for detecting a full SDF, according to the burst size allowed for the line being scanned.

In the circuit shown in FIG. 12, if the wire corresponding to burst size=5 is activated (when the FES scans a line on which the data slots have 5 data bits), the burst must be detected as full when the bit 7 is sent by the FES to said line. Consequently, the corresponding NAND gate is activated, and its output is NORed with the outputs of the other NANDs. Thus, gate 148 delivers a "SDF Full" signal each time the burst for a given line is full.

Transmission of data from RAM (36) to OSL

When the outbound S.L. scans a line Y, the FESA fetches the Xmit PDF (134) of this line and processes the PDF (134) contents to prepare the transfer of said PDF into the outbound data slot, according to the S.L. format, as explained with reference to FIG. 7.

The PDF process consists in shifting the data bits to the right, while the one delimiter is set at the left of the bits.

The loading of the data slot depends on the "line enabled" information.

Line enabled:

If a Xmit request is present, the processed PDF (134) is serialized into an outbound data slot.

If no Xmit request is present, the FESA sends an empty data slot (bits 0 to 6 set to 0, bit 7 set to 1).

Line disabled:

Bits 0 to 7 of the data slot are set to 0.

At a given time, if both SDF and PDF are full and the FESA receives no request from a line (26), the FESA stops requiring bits from the FES and waits for next Xmit request.

It is to be noted that PDF TAKEN is a working bit which is set by the outbound S.L. process when the PDF is sent to the LIC. It means that the waiting SDF (130) can be loaded in the PDF field (134).

PDF TAKEN is reset by the FESA after the transfer of SDF to PDF.

Control RAMs

As shown in FIG. 13, the control RAM is made of 2 parts: the outbound control RAM (42), which buffers the control information in the outbound direction, and the inbound control RAM (40) which buffers the information in the inbound direction, for the 32 lines as well.

The stored control information comprises control registers for the MUX (14), the LIC registers of the 32 lines, plus 32 sets (one set per line) of work registers managed by the FESA to process the lines.

The FES and microcode control information to MUX and LIC's (MUX and LIC's write registers) is stored in the outbound control RAM (42) and wait for the proper slots of the outgoing frames to be sent on the outbound serial link.

The MUX and LIC registers information entering the FESA on the inbound serial link is stored in the inbound control RAM (40) and waits for the FES and microcode requests.

FIG. 13 shows the FESA organization for the exchange of control registers between the FES (10) and the LICs.

The MUX, LIC or line control slots provided by the ISL control buffer (96) of the ISL interface (56) (FIG. 7) are loaded into the inbound control RAM (40) through an inbound control process logic (61). The ISL RAM addressing bus (160) is provided by the slot-frame address decoder (108) as explained in relation to FIG. 7.

The inbound control process logic (61) includes an ISL step counter (170) (FIG. 14) which delivers four steps ISL S0 to S3. At step S0, the content of the current control slot is loaded into the inbound CTL RAM (40). Steps S1 to S3 are used to update the scan control registers (72) as previously mentioned (FIG. 5). A first register: "LIC present register" is updated during frame 13, on reception of the line control register. A second register: "LIC wideband" is updated during frame 7, on reception of the LIC type information, telling if a given LIC is wideband (a wideband line is scanned four times more often than a not wideband line).

The control interface (68) is in charge of fetching from the inbound CTL RAM (40), the control information needed by the FES or the microcode to control the lines.

At step S1 of the FES RCV timing the FES inputs from the inbound CTRL RAM (40) the control information relative to the attached modem. At step S6 of the FES transmit timing, the FES provides control information to the modem. This information is thus loaded into the outbound control RAM (42) on step S6 of FES transmit timing.

Interface (68) mainly includes a register (buffer), and gating logic. It is also used by the microcode, either to write control information in the outbound control RAM (42) or to read control information from the inbound control RAM (40).

Depending on the RAM user (FES or serial link), the RAM address can have 2 different (but equivalent) forms :
Seen from the FES interface, each control RAM address is a concatenation of the line address and the register address.
Seen from the serial link, it is a concatenation of the slot number and the frame number (4 highest bits).
FES addressing :

| LINE ADDR BITS | | | | | REG ADDR BITS | | | |
|---|---|---|---|---|---|---|---|---|
| 3 | 4 | 0 | 1 | 2 | LIC | XMIT/RCV | R1 | R2 |

Serial Link addressing :

| SLOT COUNTER BITS | | | | | FRAME COUNTER BITS | | | |
|---|---|---|---|---|---|---|---|---|
| 0 | 1 | 2 | 3 | 4 | 0 | 1 | 2 | 3 |

The RAMS SWAP bit (bit 4 of register (66) can be set by microcode to allow a full RD/WR access to the FESA control RAMS according to the following table :

| BIT 4 | |
|---|---|
| RAMs Swap | Allows: |
| 0 | Wr Outb Ctrl RAM |
|   | Rd Inb Ctrl RAM |
| 1 | Rd Outb Ctrl RAM |
|   | Wr Inb Ctrl RAM |

The RAMs are time-shared by the FES and the 2 serial link interfaces (inbound and outbound).

The FESA has to synchronize the various RAM requests and to arbitrate them :
It monitors first the FES interface to know when the FES needs to access the RAMs.
The remaining time is available for the 2 serial link interfaces. This time is shared as follows :
In the the control process, the outbound serial link (OSL) had always a higher priority than the inbound serial link (ISL).
In the data process, priorities depend on the FES RCV/XMIT operation, since contentions between ISL and FES RCV on the one hand, and between OSL and FES XMIT on the other hand, must be avoided.

The RAM access arbitration problem is solved by an arbitration logic (100) shown in FIG. 14, for the case of a control information process, it being understood that a very similar circuit is implemented for the case of data process.

The FIG. 14 shows the three counters (162, 166, 170) which generate the steps necessary to access the control RAM by the different RAM users : FES, OSL, ISL.

It is to be noted that SIR means : step S1 of the FES receive timing. The FES step counter (162) is triggered by the receive/transmit signal of the FES interface, the OSL step counter is triggered by the occurence of OSL data bit 0 time giving the beginning of the OSL data process. Similarly, the ISL step counter is triggered by ISL data bit 0 time. The FES timing has the highest priority. Thus, there is no hold condition on step counter (162).

In the contrary, the OSL step counter (166) is held by the FES steps through OR gate (164), while the ISL step counter is held by OR gate (168) obtained by combining the output of OR gate (164) and OSL step S0.

In the case of the data process arbitration logic, OSL and ISL step counters are held in the same way, except that OSL step counter is additionally held by the transmit timing of the FES, and ISL by the receive timing of the FES.

We claim:

1. A line adapter (1) of a communications controller, for exchanging data and control information between line interface circuits, LICs, (20) connected to external transmission lines (26) and the central control unit, CCU, of the communications controller, said line adapter including, for scanning the lines (26), cyclic scanning means FES (10) exchanging information with the LICs (20) through a bidirectional, inbound-outbound, serial link (12) on which data and control informations are partitioned into frames comprised of data slots and control slots, each pair of data and control slots being dedicated to a determined line (26), line-adapter (1) being characterized in that:
the scanning means FES (10) and serial link (12) are being operated independently according to their own timings, said scanning means including a front end scanner adapter interface, FESA, (11), for interfacing said cyclic scanning means FES (10) with said bidirectional serial link (12).

2. A line adapter according to claim 1, wherein said FESA (11) includes temporary storage means (36, 38, 40, 42) for storing data and control information transmitted from the LICs (20) to the FES (10) through the inbound serial link, ISL, (24), and data and control information transmitted from the FES (10) to the LICs (20) through the outbound serial link (22).

3. A line adapter according to claim 2, wherein: the access of the scanning means FES (10) and of the inbound serial link (24) or outbound serial link (22) to said storing means is continuously arbitrated by an arbitration logic (100) providing time-shared access to said storage means (36, 38, 40, 42), according to the relative priorities of operation of said scanning means FES (10), inbound serial link (24) and outbound serial link (22) in the communications controller.

4. A line adapter according to claim 2, wherein: said storage means (36, 38, 40, 42) comprise a data receive RAM (38) for receiving data slots from the inbound serial link (24) through an inbound serial link interface (56) and, upon request of an inbound data process logic (60), for loading the data slots corresponding to a given line (26) into a dedicated data field (78, 82) of said data receive RAM (38), and, upon request of a data bit receive interface (70), for transmitting said data slots bit by bit to the FES (10) synchronously with the receive scanning timing of said FES (10).

5. A line adapter according to claim 2, wherein: said storage means (36, 38, 40, 42) comprise a data transmit RAM (36) for transmitting data from the FES (10) to the outbound serial link (22), the data corresponding to a given line (26) being transmitted bit by bit by the FES (10) according to its own transmit scanning timing, to a data bit transmit interface (73) where said data are assembled into data bursts and loaded into said data transmit RAM (36), and then read from said RAM (36) upon request of an outbound data process logic (62) and transmitted onto the outbound serial link (22) through an outbound serial link interface (58).

6. A line adapter according to claim 2 or 4, wherein: said storage means (36, 38, 40, 42) comprise an inbound control RAM (40) for receiving control slots taken from the inbound serial link (24) by the inbound serial link interface (56), and, upon request of an inbound control process logic (61), loading the control slots corresponding to a given line (26) into a dedicated control field of said RAM (40), and, upon request of a control interface (68), transmitting said controls lots to the FES (10) on control bus (80).

7. A line adapter according to claim 2 or 5, wherein said storage means (36, 38, 40, 42) comprise an outbound control RAM (42) for transmitting control information from the FES to the control registers of the line (26) and LICs (20) through the outbound serial link (22), the controls lots corresponding to a given line (26) being transmitted by the FES (10) through the control interface (68) and loaded into a zone of RAM (42) dedicated to said lines (26) and then read from said RAM (42) upon request of an outbound control process logic (63) and transmitted onto the outbound serial link (22) through an outbound serial link interface (58).

8. A line adapter according to claim 2 or 3, wherein said arbitration logic (100) provides to the FESA (10) the highest priority for accessing to the storage means.

* * * * *